Jan. 12, 1932.  A. G. RAYBURN ET AL  1,840,867
HYDRAULIC POWER TRANSMISSION
Original Filed Aug. 25, 1924  3 Sheets-Sheet 2

INVENTORS
ALDEN G. RAYBURN
ELWYN M. RAYBURN
JAMES WAYNE SUMNER
ATTORNEYS

Jan. 12, 1932.   A. G. RAYBURN ET AL   1,840,867
HYDRAULIC POWER TRANSMISSION
Original Filed Aug. 25, 1924   3 Sheets-Sheet 3

INVENTORS
ALDEN G. RAYBURN
ELWYN M. RAYBURN
JAMES WAYNE SUMNER
BY
*White Frost & Kraus*
their ATTORNEYS Patented Jan. 12, 1932

1,840,867

UNITED STATES PATENT OFFICE

ALDEN GRANVILLE RAYBURN AND ELWYN M. RAYBURN, OF SAUSALITO, AND JAMES WAYNE SUMNER, OF LOS ANGELES, CALIFORNIA, ASSIGNORS, BY MESNE ASSIGNMENTS, OF FIFTY-ONE PER CENT TO AUTOMOTIVE ENGINEERING CORPORATION, A CORPORATION OF DELAWARE

HYDRAULIC POWER TRANSMISSION

Application filed August 25, 1924, Serial No. 733,949. Renewed June 29, 1929.

The invention relates to hydraulic power transmissions in which power is transferred from a driving member to a driven member thru the medium of a substantially non-compressible liquid.

An object of the invention is to provide a hydraulic power transmission which is efficient in operation and simple in construction.

Another object of the invention is to provide a hydraulic power transmission in which the speed of the driven member may be varied with respect to the speed of the driving member.

A further object of the invention is to provide a hydraulic power transmission in which substantially all of the energy delivered by the driving shaft is transmitted to the driven shaft.

The invention possesses other advantageous features, some of which with the foregoing will be set forth at length in the following description where we shall outline in full that form of the invention which we have selected for illustration in the drawings accompanying and forming part of the present specification. In said drawings we have shown one form of hydraulic power transmission apparatus embodying our invention, but it is to be understood that we do not limit ourselves to such form, since the invention, as set forth in the claims, may be embodied in a plurality of forms.

Referring to said drawings:

Figure 6 is a cross section taken on the line 6—6 of Figure 1 to show the porting arrangements for the declutching valve.

Figure 1:
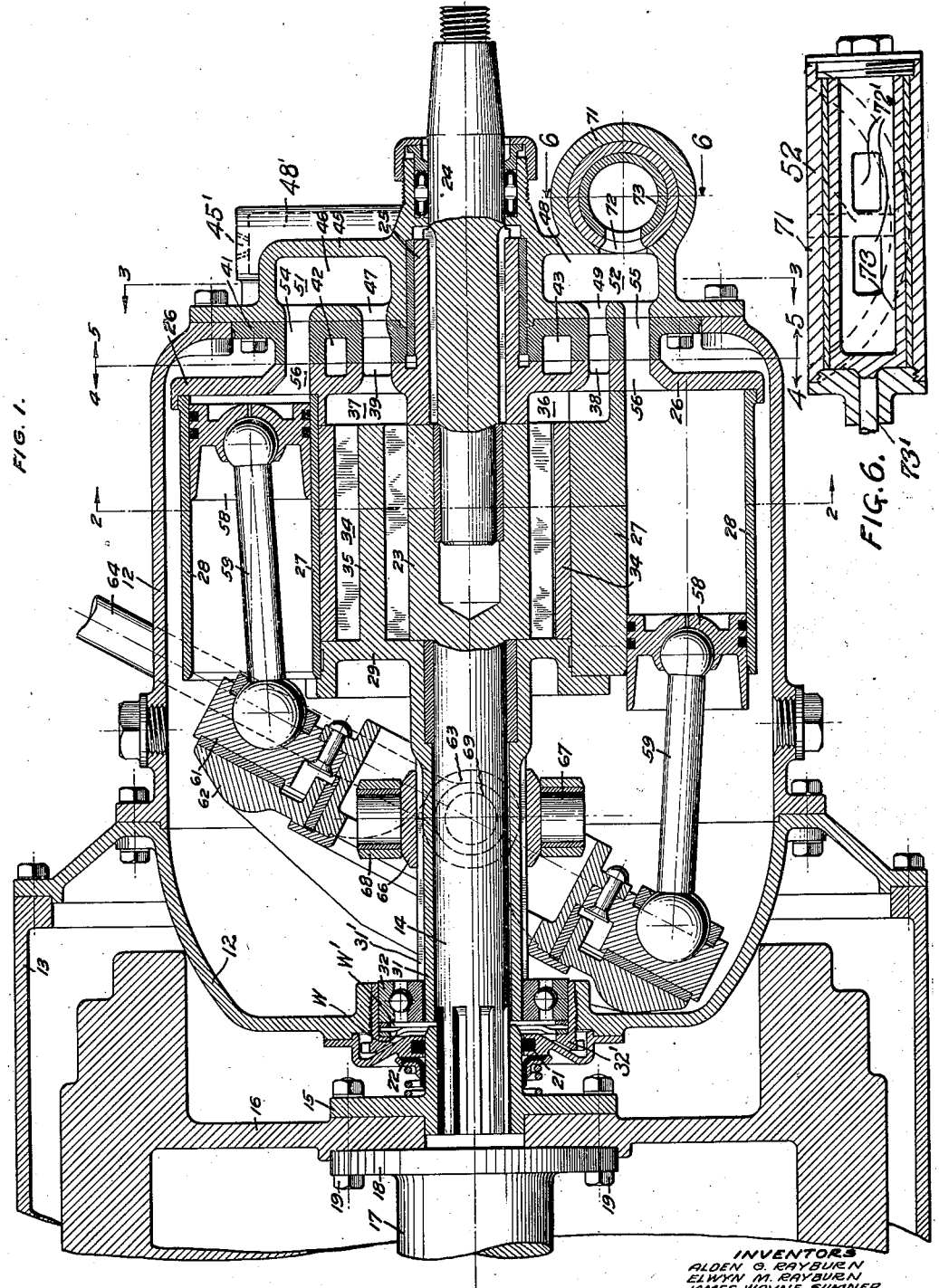
Figure 1 is a longitudinal vertical section thru a power transmission apparatus embodying our invention.
Figure 2:
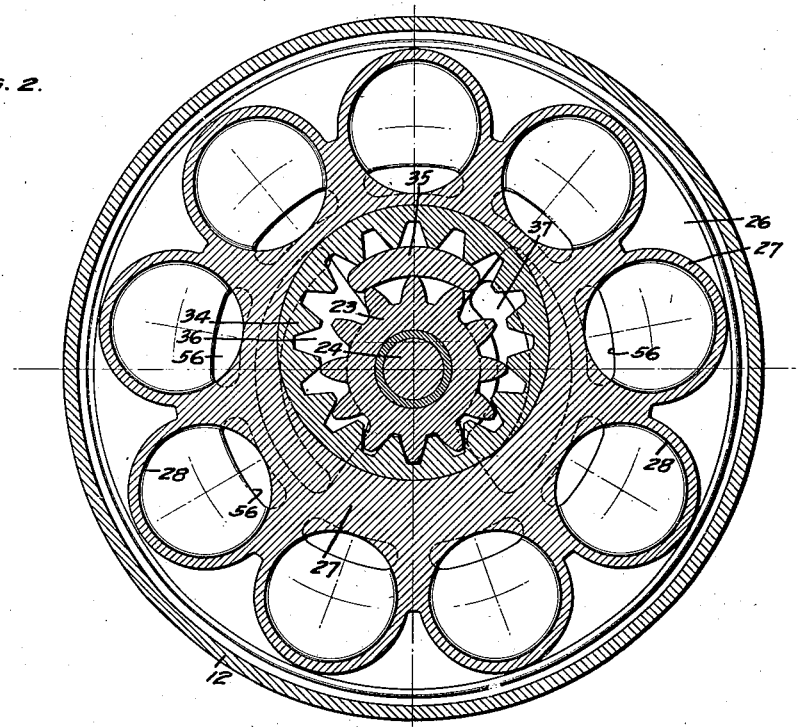
Figure 2 is a cross section of the apparatus taken on the line 2—2 Figure 1.
Figure 3:
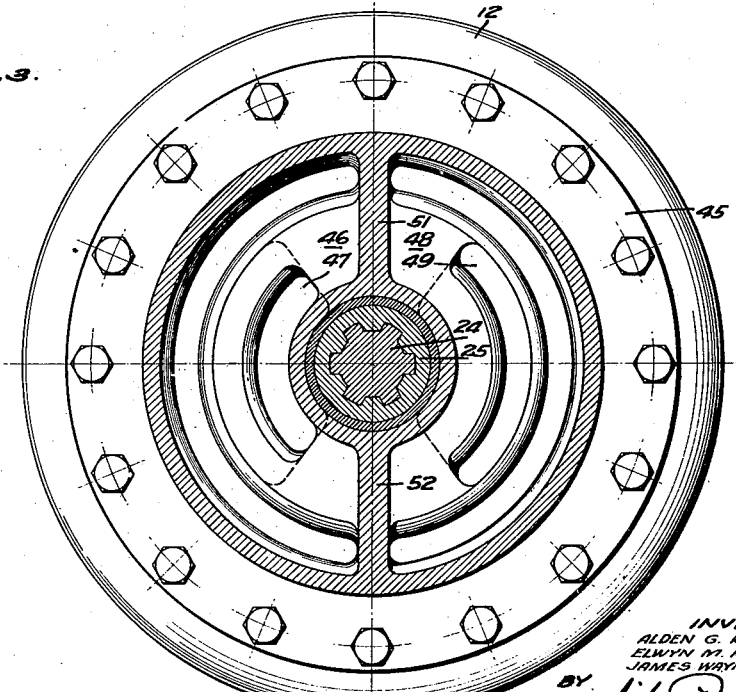
Figure 3 is a cross section taken on the line 3—3 Figure 1.
Figure 4:
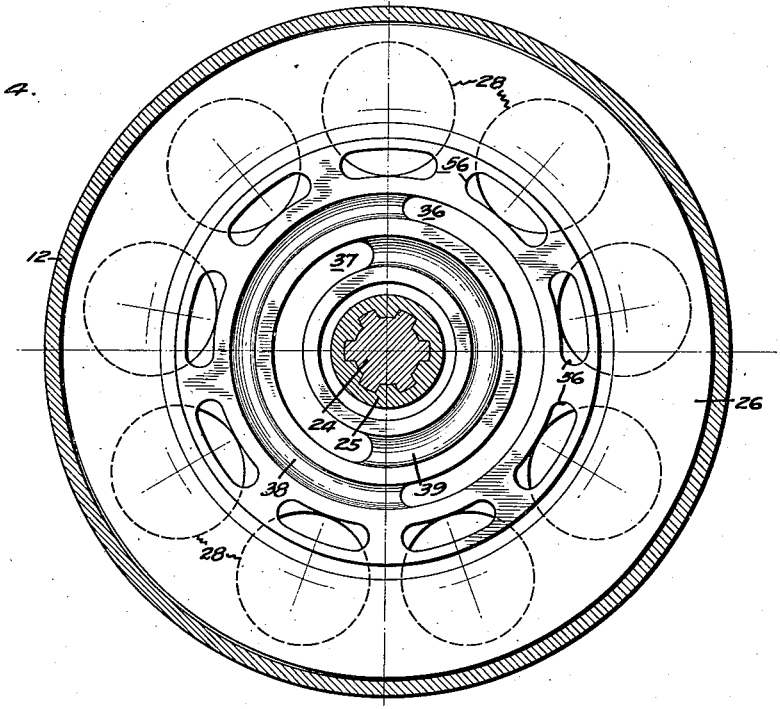
Figure 4 is a cross section taken on the line 4—4 Figure 1.
Figure 5:
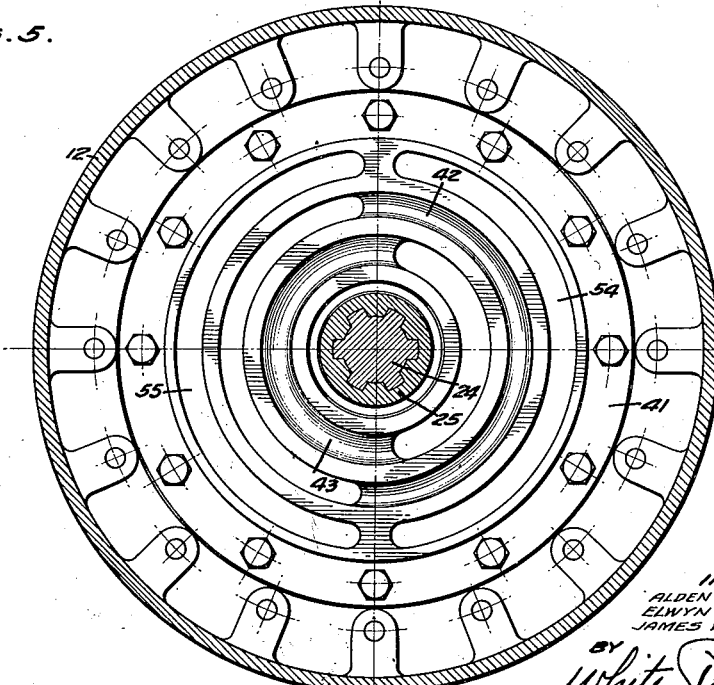
Figure 5 is a cross section taken on the line 5—5 Figure 1.

The apparatus comprises a driving member adapted to be connected to a prime mover, such as the crank shaft of an engine, and a driven member which is flexibly connected to the driving member by a fluid medium. The driven member is adapted to be connected to the instrumentality to be driven, such as the driving wheels of a vehicle or the propeller shaft of a vessel or other instrumentalities. In the form of apparatus disclosed in the drawings, the flexibility of the connection between the driving and driven members may be varied at will, to vary the ratio of the speeds of the two members. The driving and driven members may rotate in synchronism or the speed of rotation of the driven member may be less than the speed of rotation of the driving member, depending upon the adjustment of the apparatus. The fluid displaced by the relative rotation of the driving member with respect to the driven member is employed to do useful work in rotating the driven member, so that the torque of the driven member is varied with the speed ratio.

The apparatus preferably comprises a stationary housing 12 suitably supported on the frame 13, which may constitute an extension of the engine frame. Extending into the housing 12, at one end thereof, is a driving member comprising a shaft 14 which is provided on its end outside of the housing with a flange plate 15 which, in the present instance, is secured to the flywheel 16. The crank shaft 17 of the engine is provided on its end with a flange 18 and bolts 19 serve to secure the crank shaft, the flywheel and the flange plate 15 together. Suitable packing devices, such as the packing ring 21 and the spring pressed cup leather 22 are provided between the hub of the flange plate 15 and the housing 12 to prevent leakage of liquid thru the joint.

Secured to or formed integral with the inner end of the driving shaft 14 is a gear or pinion 23 which forms part of a gear pump which operates to pump liquid during the rotation of the driving shaft 14.

Extending into the housing from the opposite end is the driven member or driven shaft 24, the inner end of which is journalled in a bearing formed in the gear 23, thus forming a supporting bearing for the gear. Secured to and rotatable with the driven shaft 24 is the hub 25 of the plate 26, which forms part of the driven element. Secured to and rotatable with the plate 26 is a casing 27 which forms the casing of the gear pump and which also forms a plurality of parallel motor cylinders 28. The casing 27 forms the peripheral wall of the gear pump, the plate 26 forms one side wall and the plate 29, which is secured to the casing 27, forms the other side wall of the pump. The pump casing and the cylinders 28 thus form a unit, the parts of which may be integral or securely fastened together. The plate 29 which constitutes a portion of the driven element, is provided with an elongated hub 31 thru which the driving shaft 14 extends and in which the driving shaft is journalled. The extended end of the hub 31 is journalled in the housing 12 by the ball-bearing 32.

The thrust bearing 32 abuts the end of the splined portion 31' of hub 31 and is maintained in such position by washers $w$ and $w'$ and a bearing cage 32'. The washer $w$ is a specially shaped spring washer of predetermined tension designed to react between the cage and bearing and hence, by forcing hub 31 to the right to maintain a proper initial sealing contact between the plate 26 and the surface of a valve 41 (later to be described), when the apparatus is in neutral and while pressure is being built up in cylinders 28. The cage 32' is threaded into the housing 12 as shown in order that it may be manually rotated to vary the running clearance between plate 26 and said valve.

The casing 27 is provided with an eccentric bore or chamber, constituting the pump chamber, and in this chamber there is arranged a floating ring gear 34, meshing with the gear 23 and eccentrically disposed with relation thereto. On one side of the axis of the gear 23, the two gears are in mesh and on the other side of the axis the teeth of the gears are spaced apart. Arranged in this space is an arcuate abutment 35, which is integral with one or both of the side walls of the pump casing. The teeth of the gear 23 move in close sliding contact with the inner surface of the abutment 35 and the teeth of the floating ring gear 34 move in close sliding contact with the outer surface of the abutment 35, so that as the gear 23 is rotated, liquid is carried from one side of the abutment to the other, that is, from the low pressure side to the high pressure side. The chamber in which the gears are disposed, is provided with an inlet port 36 at one side of the abutment and with an outlet port 37 on the other side of the abutment. The ring gear 34 forms a close sliding contact with the peripheral wall of the pump chamber and is always in mesh with the gear 23. When there is no relative movement between the driving and the driven members, the gear elements of the pump rotate about the axis of the gear 23 and there is no relative movement of the gear 34 with respect to the gear 23. When the driving and the driven element, however, are rotated at different speeds, the gear 23 rotates at the speed of the driving element and the pump casing and the abutment 35 rotate at the speed of the driven element, so that there is relative rotation between the two gears 23 and 34. When the driven element is stationary and the driving element rotating the floating gear 34 rotates within the pump chamber on a stationary axis.

Means are provided for directing the high pressure liquid discharged by the pump to the cylinders 28 to cause the movement of pistons therein and for directing the liquid discharged from the cylinders on the reverse stroke of the pistons, to the intake or low pressure side of the pump. The inlet port 36 of the pump is arcuate in shape and opens on the face of the end plate 26, in a circular groove 38, concentric with the axis of the driven shaft 24 and extending in a complete circle. The outlet port 37 of the pump is arcuate in shape and opens into a circular groove 39 formed in the face of the end plate 26 and this groove extends in a complete circle concentrically with respect to the axis of the driven shaft 24 and, in the present instance is spaced apart radially from the groove 38. The plate 26 is caused to be in an oil tight sliding contact with the valve plate 41 which is secured to the housing 12. The valve plate 41 is thus stationary and the end plate 26 rotatable. The valve plate 41 is provided with a circular groove 42 which registers with the groove 38 in the end plate 26 and is also provided with a circular groove 43 which registers with the circular groove 39 in the end plate 26, thereby forming two complete circular conduits, concentric with the axis of the driven shaft 24 and spaced apart radially.

The housing 12 is closed at the end by the housing end plate 45, which plate is provided with a high pressure chamber 46, which is continually in communication with the groove 43 in the valve plate thru the arcuate port 47. The end housing plate 45 is also provided with a low pressure chamber 48 which is continually in communication with the groove 42 in the valve plate thru the port 49. The two chambers 46 and 48 are spaced apart by the diametrically disposed webs or walls 51—52 and the ports 47 and 49 are preferably arcuate in form to provide sufficient area to permit the free flow of the liquid from the pump into the high pressure chamber and from the low pressure chamber into the pump. The webs or walls 51 and 52 are relatively thin, so that the chambers 46 and 48 are substantially semi-circular in shape. The end plate 45 is so shaped and designed (see Fig. 1) as to form a vertical chamber 48' for containing low pressure fluid to feed it into the low pressure chamber 48. A filler plug 45' may close the upper end of chamber 48' or the latter may be connected with an auxiliary storage tank (not shown).

From the high pressure chamber 46, the liquid passes into the cylinders in which the pistons are receding from the head plate 26 and, the liquid ejected from the cylinders on the return stroke of the pistons, passes into the low pressure chamber 48. The valve plate 41, which is fixed to the end housing plate 46, is provided with a substantially semi-circular outlet port 54, communicating with the chamber 46 and with a substantially semi-circular inlet port 55, communicating with the chamber 48. The end plate 26 of the motor, of which the cylinders form a part, is provided with a plurality of ports 56, there being one port for each cylinder. These ports 56 are disposed in the same radial plane as the ports 54 and 55, so that the liquid is free to pass into and out of the cylinders 28.

Disposed in each cylinder 28 is a piston 58 and the several pistons 58 are connected by the connecting rods 59 with the rotatable ring 61, which is connected to the driven member so that it rotates in synchronism therewith. The ring 61 may lie at variable angles to the axis of rotation of the driven member, so that, as the driven member rotates, the pistons are reciprocated in the cylinders. The ring 61 is suitably mounted on a bearing plate 62, which determines the angularity of the ring 61. The bearing plate 62 is provided with suitable trunnions 63 which are mounted in the housing 12 and secured to one of the trunnions, which extends from the housing, is a lever or other device 64, by means of which the angularity of the bearing plate 62 may be varied. Suitable means may be provided for holding the bearing plate 62 in any desired adjusted position. It is apparent that as the angularity of the bearing plate 62 is increased, that is, as it is inclined further from the perpendicular, the stroke of the pistons increases and consequently the volumetric displacement of the cylinders, per rotation of the driven member, increases. The cylinders and associated pistons, which constitute a motor, comprise in effect a displacement apparatus, the displacement volume of which may be varied. When the bearing plate 62 is perpendicular to the axis of rotation of the driving shaft 14, there will be not reciprocation of the pistons and consequently no discharge from the high pressure chamber 46, so that the driving element and the driven element will rotate in synchronism. As the angularity of the bearing plate 62 is increased, the speed of the driven element with respect to the speed of the driving element will decrease, due to the passage of liquid to the motor.

The ring 61 is connected to the driven member so that the power produced by the motor is transmitted to the driven member. Secured to the extended hub 31 of the driven member as by the splines 31' is a ring 66 which is provided with diametrically disposed pins or studs 67. These studs are journaled in a ring 68 surrounding the ring 66 and, journaled in the ring 68 at right angles to the pins or studs 67, are pins or studs 69 which are secured to and extend from the ring 61. This provides a gimbal joint between the rings 61 and the hub 31, so that the ring and hub rotate in synchronism and so that power delivered to the ring 61 by the pistons 58, is transmitted to the hub 31, which forms an integral part of the driven member.

Means are provided for by-passing the liquid between the high pressure chamber 46 and the low pressure chamber 48 for the purpose of operatively disconnecting the driven element from the driving element. To accomplish this result, we provide a chamber 71 on the housing end plate 45, which chamber is disposed at right angles to the plane of the dividing walls 51 and 52 and which chamber extends above and below one of these walls and which is provided with ports 72 opening into both the high pressure and the low pressure chambers. Disposed in the casing 71 is a rotary declutching valve 73, which in one position closes the ports 72, thereby cutting off direct communication between the high pressure and low pressure chambers. In the other position, however, such as is shown in Figures 1 and 6, the valve 73 establishes, by way of a pair of ports 72' opening through its wall into the bore of the valve, direct communication between the high pressure and low pressure chambers, thereby short-circuiting the pump. The valve has a stem 73' designed for manual operation as by connecting it with an automobile clutch pedal to be rotated when the latter is depressed.

Reverse is accomplished by tilting the bearing plate 62 in the opposite direction or angle to that corresponding to forward position. This, of course, is done after the vehicle has been brought to a substantially complete stop, and causes pressure from the pump through the motor pistons to re-act on the opposite side of the angle thus reversing the direction of rotation of the driven member or shaft 24.

In operation, when the driven member 24 is stationary and the shaft 17 is rotated the pinion 23 will be driven with the shaft 17 and will cause rotation of the ring gear 34. This causes the pumping of the fluid from between the gears 23 and 34 to the motor cylinders 28 and causes the reciprocation of the motor pistons which in turn drive the shaft 24 together with the cylinders. As the cylinders rotate the eccentric mounting of the ring gear 34 will be rotated, and the relative rotation of the ring gear 34 and the pinion 23 will gradually decrease until the point where the shaft 24 will be rotating at the same speed as the shaft 27, when relative rotation of the ring gear and pinion will cease. In this way it will be seen that the gear pump delivers fluid at its maximum capacity when the shaft 24 is stationary and as the speed of the shaft 24 approaches the speed of the shaft 17 the quantity of fluid pumped will gradually decrease until the transmission reaches direct drive.

Having described a preferred embodiment of the invention what is desired to be secured by Letters Patent and claimed as new is:—

We claim:

1. A hydraulic transmission apparatus comprising driving means; driven means; a rotary pump consisting of complemental elements carried by said driving and driven means and actuated by the relative rotation thereof; a motor for rotating said driven means, said motor having a central space for receiving said rotary pump; and means for distributing fluid between said rotary pump and said motor.

2. A hydraulic transmission apparatus comprising driving means; driven means; a rotary pump consisting of complemental elements carried by said driving and driven means and actuated by the relative rotation thereof; a motor for rotating said driven means; and means for distributing fluid between said rotary pump and said motor; said last mentioned means including a stationary plate valve having separate discharge and suction passages for conveying high pressure fluid from the pump toward the motor and for returning low pressure fluid from the motor to the pump respectively.

3. In the apparatus defined in claim 2, a valve of the rotary plug type mounted adjacent said plate valve and provided with means for interconnecting the high and low pressure fluid passages.

4. In the apparatus defined in claim 1, said last mentioned means comprising separate high and low pressure chambers; suction and discharge ports for the pump; inlet and exhaust ports for the motor; and a single valve of the plate or disc type for establishing communication between said chambers and said ports.

5. A hydraulic transmission unit comprising a driving member; a driven member; a rotary pump consisting of relatively rotatable and nested complemental elements carried by said driving and driven members and actuated by the relative rotation thereof; a piston type motor having connecting rod mechanism arranged to actuate said driven member; and means for distributing operating fluid between said rotary pump and said motor.

6. A hydraulic transmission system comprising a driving shaft; a driven shaft; a motor connected to said driven shaft and provided with a cylindrical central space; a rotary pump mounted in said central space, said pump consisting of relatively rotatable complemental units actuated by said driving and driven shafts respectively; and means for distributing operating fluid between said pump and said motor.

7. A fluid transmission comprising a driving member; a driven member; a fluid motor connected to said driven member and provided with a hollow central space, a rotary pump mounted in said central space, said pump consisting of complemental units actuated by said driving and driven shafts respectively; a head common to the pump and motor and provided with inlet and discharge passages for each; and means for distributing fluid between said pump and motor passages, said means including a plate valve mounted in surface engagement with said head.

8. A fluid transmission comprising a driving member; a driven member; a fluid motor connected to said driven member and provided with a hollow central space, a rotary pump mounted in said central space, said pump consisting of complemental units actuated by said driving and driven shafts respectively; a head common to the pump and motor; high and low pressure fluid chambers; a plate type valve mounted between said head and said chambers; and means for establishing communication of said pump and motor with said chambers, said means comprising separate substantially semi-circular ports in the head portion opposite the pump, a pair of separate circular concentric conduits formed in said head in communication with said respective semi-circular ports, another pair of similar conduits formed in said plate valve in coincidental communication with the first mentioned conduits, substantially semi-circular ports in said plate valve connecting said high and low pressure chambers with the last mentioned conduits, and cooperating ports and passages in those portions of said head and said plate valve opposite the motor for timing the communication of said motor with said chambers.

9. In combination with the apparatus defined in claim 8 a clutch valve of the rotary plug type for interconnecting said high and low pressure chambers, said valve being arranged substantially normal to said semi-circular ports.

10. A hydraulic torque-multiplying transmission unit comprising a housing; driving and driven means mounted in said housing; a rotary pump consisting of complemental units carried by said driving and driven means respectively; a motor for actuating the driven means, and means providing fluid paths between said rotary pump and said motor, said means including a stationary plate valve arranged normal to the axis of the transmission for controlling the distribution of operating fluid between said pump and said motor.

11. A hydraulic torque-multiplying transmission unit comprising a housing; driving and driven means mounted in said housing; a rotary pump consisting of complemental units carried by said driving and driven means respectively; a motor for actuating the driven means; means providing fluid paths between said rotary pump and said motor, said means including a plate valve for controlling the distribution of operating fluid between said pump and said motor; and means cooperating with said housing and said driven means to move the latter with respect to the former for the purpose of adjusting the surface clearance of said plate valve.

12. A hydraulic torque-multiplying transmission unit comprising a housing; driving and driven means mounted in said housing; a rotary pump consisting of complemental units carried by said driving and driven means respectively; a motor for actuating the driving means; fluid ports opening into said motor; suction and delivery ports opening into said pump; means mounted between said pump and motor ports for distributing fluid therebetween, said means including a plate valve having one of its surfaces maintained to provide a running clearance with moving parts of the apparatus; and adjustable means carried by said housing and engaging a portion of said driven means to move the latter and the pump in a manner to vary said running clearance.

13. In a hydraulic transmission unit, a driving shaft; a driven shaft; a rotary type fluid pump consisting of complemental parts mounted upon said respective shafts and actuated by the relative rotation thereof; a fluid motor comprising a set of spaced rotating cylinders surrounding said pump to form a nest for the latter, pistons in said cylinders, connecting rods for said pistons, means including a universal joint connecting said rods with the driven shaft at a point relatively closely spaced from one end of said pump, an angle plate rotatably receiving said means; and an adjustable trunnion mounting for said angle plate for changing its inclination to vary operation of said motor.

14. A hydraulic transmission apparatus comprising a rotary pump and a driving member connected thereto; a motor and a shaft driven thereby; said rotary pump comprising a set of complemental pumping elements disposed in nested relationship to each other and substantially concentrically disposed relative to said motor; and means for distributing fluid between said pump and said motor.

15. A differential transmission, comprising a fluid motor including a plurality of pistons and cylinders and a rotary fluid pump comprising relatively rotatable complemental elements substantially concentrically disposed, said cylinders and pistons being arranged symmetrically with respect to the axis of rotation of the rotary pump, and being capable of bodily rotation as a unit with said rotary pump or differential rotation with respect thereto and means to distribute the fluid between said pump and motor during the differential rotation between motor and pump.

16. A transmission comprising a casing, a driving shaft, a driven shaft, a hollow cylinder block carried by said driven shaft, cylinders in said block, pistons in said cylinders, means to adjust the stroke of said pistons, a rotary pump comprising nested complemental elements mounted in said hollow cylinder block, said pump being operated by said driving shaft, and means carried by said casing for distributing the fluid between said pump and motor.

17. A fluid transmission including a casing, a driving shaft, a driven shaft, a gear fixed to the driving shaft, a cylinder block surrounding said gear and rotatable with the driven shaft, cylinders and pistons associated with said block and connected to the driven shaft to rotate it with respect to said block, a ring gear eccentrically arranged around said gear and fitting in said cylinder block, an abutment disposed between said gears and movable with said cylinder block, and fluid distributing means carried by said casing to control the flow of fluid from said gears to said cylinders.

18. In a hydraulic transmission unit or the like, in combination, a rotatable pump casing having fluid inlet and outlet ports; a cylindrical chamber in said casing disposed eccentrically with respect to the axis of rotation of the casing; a ring rotor journaled in said eccentric chamber; a central rotor in interengagement with said ring rotor and journaled on the axis of rotation of said casing; means adjacent said ring and central rotors for dividing the space therebetween into fluid pressure chambers; means providing stationary ports in permanent connecting relation with said outlet ports; and means connected with said casing for receiving operating fluid from said stationary ports, utilizing it, and returning it to said inlet ports, said last named means serving to create a back pressure upon the fluid discharged from said pump and hence to control the relative rate of rotation of the parts of the latter.

19. In a device of the character of that described, in combination, a rotatable pump casing having fluid inlet and outlet ports; a chamber in said casing disposed eccentrically with respect to the rotational axis of said casing; a ring rotor journaled in said chamber; a central rotor in interengagement with said ring rotor and aligned with said rotational axis; means for driving said central rotor; a motor mounted adjacent said pump casing in driving relationship therewith; and means for distributing fluid between the pump ports and said motor.

20. In combination, a rotatable member, a pump ring gear eccentrically journalled for rotation in said member, a rotatable pinion meshing with said ring gear and having its axis of rotation in alignment with the axis of said rotatable member; and means for varying the relative rotation of said pinion and said rotatable member.

In testimony whereof, we have hereunto set our hands.

ELWYN M. RAYBURN.
ALDEN GRANVILLE RAYBURN.
JAMES WAYNE SUMNER.